United States Patent

Eckerlin

[15] 3,698,632

[45] Oct. 17, 1972

[54] FLUIDIC ADDER-SUBTRACTER UTILIZING THRESHOLD LOGIC

[72] Inventor: Herbert M. Eckerlin, Raleigh, N.C.

[73] Assignee: Corning Glass Works, Corning, N.Y.

[22] Filed: Dec. 2, 1969

[21] Appl. No.: 881,469

[52] U.S. Cl. ..........235/201 PF
[51] Int. Cl. ..........G06m 1/00
[58] Field of Search ......235/200, 201, 172; 137/81.5

[56] References Cited

UNITED STATES PATENTS

| | | | |
|---|---|---|---|
| 2,671,607 | 3/1954 | Williams et al. | 235/172 |
| 3,586,845 | 6/1971 | Komamiya et al. | 235/172 |
| 3,609,329 | 9/1971 | Martin | 235/172 X |
| 3,340,885 | 9/1967 | Bauer | 137/81.5 |
| 3,342,197 | 9/1967 | Phillips | 137/81.5 |
| 3,395,719 | 8/1968 | Boothe et al. | 137/81.5 X |
| 3,503,423 | 3/1970 | Edell | 235/201 X |

OTHER PUBLICATIONS

H. R. Grubb, " Fluid Binary Full-Adder" , IBM Technical Disclosure Bulletin, Vol. 6, No. 1, June 1963, pp. 29- 30.

*Primary Examiner*—Richard B. Wilkinson
*Assistant Examiner*—Lawrence R. Franklin
*Attorney*—Clarence R. Patty, Jr., Walter S. Zebrowski and William J. Simmons, Jr.

[57] ABSTRACT

A fluidic adder-subtracter stage utilizing the principles of threshold logic. This circuit consists of two fluidic threshold gates, a first having three inputs and a second having four inputs. The two bits from the given order and the carry bit or the borrow bit from the previous order are coupled to the three first gate inputs and three of the second gate inputs. An output from the first gate is coupled to the fourth input of the second gate. When the stage is utilized as an adder the first gate provides a carry out signal and the second gate provides a sum signal. When it is used as a subtracter, the first gate provides a borrow out signal and the second gate provides a difference signal.

7 Claims, 5 Drawing Figures

INVENTOR.
Herbert M. Eckerlin
BY William J Simmons Jr
ATTORNEY

INVENTOR.
Herbert M. Eckerlin
BY William J. Simmons Jr.
ATTORNEY

FLUIDIC ADDER-SUBTRACTER UTILIZING THRESHOLD LOGIC

CROSS-REFERENCES TO RELATED APPLICATIONS

This application is related to my copending applications, Ser. No. 881,537 entitled "Fluidic Threshold Gate" and Ser. No. 881,439 entitled "Fluidic Binary Comparator Utilizing Threshold Gates," both filed on even date herewith.

BACKGROUND OF THE INVENTION

This invention relates to an adder-subtracter employing pure fluid logic elements. More particularly, this invention relates to fluidic adder-subtracters which utilize fluidic threshold gates.

Fluidic adder-subtracters are used in data processing systems. Since the fluid amplifiers and other pure fluid logic elements utilized therein are capable of withstanding extreme environmental conditions such as shock, high temperature, vibration and the like, and since their long lifetime permits the use thereof for long periods of operation, systems utilizing such components are preferred over electronic devices in many applications.

Although fluidic devices possess the above-noted advantages, they are relatively large and expensive. Conventional fluidic adder-subtracters, which utilize various types of fluidic logic gates, require many steps and therefore consist of many fluidic devices. Obviously, a fluidic binary comparator consisting of fewer gates than are required by prior art comparators would possess the additional advantages of reduced size, weight, and cost.

SUMMARY OF THE INVENTION

It is therefore an object of the present invention to provide a fluidic adder-subtracter which utilizes the principles of threshold logic to reduce the number of fluidic elements necessary to perform the adder-subtracter function, thereby overcoming the above-noted disadvantages.

Briefly, the adder-subtracter of this invention consists of a first fluidic threshold gate having three input terminals and a second threshold gate having four input terminals. Three input signals are provided, two bits from the given order and the possible carry or borrow bit from the previous order. All three input signals are coupled to the three input terminals of the first gate and three of the input terminals of the second gate. In addition, an output from the first gate is coupled to the fourth input terminal of the second gate. Depending on whether the circuit is to function as an adder or a subtracter, the carry out signal or the borrow out signal, respectively, is provided by the first gate and the sum signal or difference signal, respectively, is provided by the second gate.

DESCRIPTION OF THE PREFERRED EMBODIMENT

Figure 1:
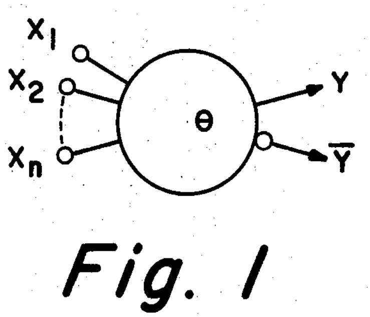
FIG. 1 is a symbolic representation of a fluidic threshold gate.

FIG. 1 schematically represents a fluidic threshold gate as a circle containing the symbol $\theta$ which is the threshold of the gate. The gate has n binary inputs, $X_1, X_2 \ldots X_n$, and two binary outputs, Y and its complement $\overline{Y}$, where $\overline{Y}$ is the conventional logic designation for not Y. Each of the inputs has associated therewith a Boolean value, $a$, which may be 0 or 1, and a weight $w$, which can be any real number, positive, negative, or zero. Inputs with positive weights are said to be "excitatory," and those with negative weights are said to be "inhibitory."The value of any given input $X_i$ is determined by the product $(a \times w)$ for that input, and the total input to the gate is the algebraic sum of all the input products. If the total input is equal to or greater than the threshold, the output Y will be "1." If the total input is less than the threshold, the output Y will be "0."Note that the $\overline{Y}$ output is illustrated as a line extending from a small circle. This can be summarized as follows:

If $$\sum_{i=1}^{n} a_i X_i w_i \geq \theta,\ Y=1 \text{ and } \overline{Y}=0$$

If $$\sum_{i=1}^{n} a_i X_i w_i < \theta,\ Y=0 \text{ and } \overline{Y}=1$$

Thus the Y output of the gate is at the "1" level whenever this weighted sum of the inputs equals or exceeds the threshold. Threshold gates of the type represented by FIG. 1 are described in my aforementioned copending application, Ser. No. 881,537.

Figure 2:
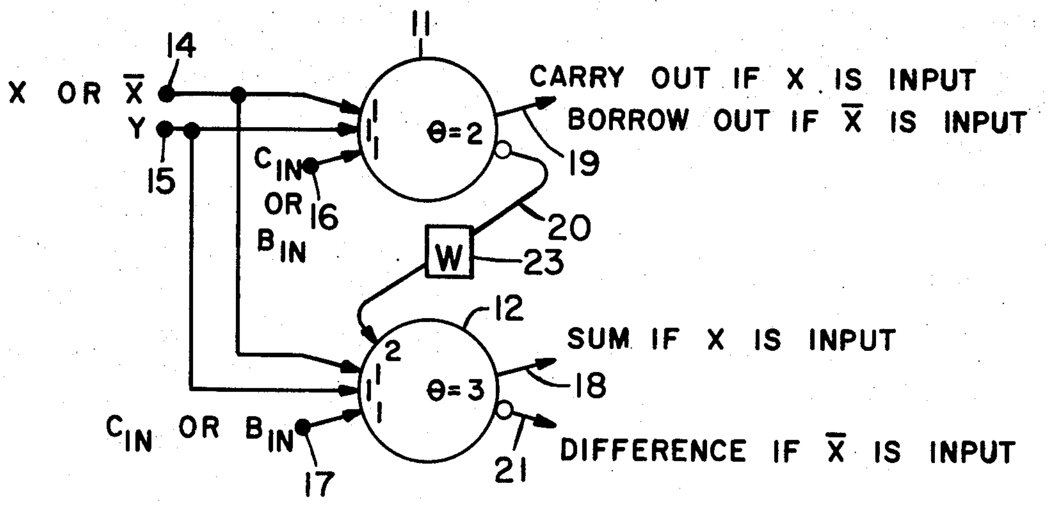
FIG. 2 is a schematic diagram of an adder-subtracter circuit utilizing a plurality of threshold gates.

As illustrated in FIG. 2, two threshold gates 11 and 12 of the type schematically represented in FIG. 1 can be interconnected to form a fluidic adder-subtracter. In binary arithmetic operations, a full adder sums three bits, two bits from the given order which are connected to terminals 14 and 15 and the possible carry bit from the previous order. The carry signal $C_{in}$ is coupled to the terminal 16 of the gate 11 whereas $\overline{C}_{in}$ is coupled to the terminal 17 of the gate 12. The outputs of the full adder are the SUM of the given order, which appears at the output terminal 18, and the $CARRY_{out}$ to the next higher order which appears at the output terminal 19. The logical equations for the adder are:

$$SUM = X\overline{Y}\overline{C}_{in} + \overline{X}Y\overline{C}_{in} + \overline{X}\overline{Y}C_{in} + XYC_{in} \quad (1)$$

$$CARRY_{out} = XY + XC_{in} + YC_{in} \quad (2)$$

The $CARRY_{out}$ is a simple majority function that can be realized by the threshold gate 11 in which all inputs have unity weight and the threshold is set at 2. Inspection of Equation (1) shows that the SUM function of the adder is not unate in three variables and therefore cannot be generated by the single threshold gate 11. However, if the complement of $CARRY_{out}$ is used as the fourth input to the gate 12, a unate expression for the SUM can be developed. This function $$SUM = \overline{CARRY}_{out}(X + Y + C_{in}) + X\,Y\,C_{in}$$

is also a threshold function, and can be generated by the weight assignments:

$$X = Y = C_{in} = 1, \overline{CARRY}_{out} = 2, \theta = 3.$$

Therefore, as shown in FIG. 2, the terminals 14 and 15 are connected to two input terminals of the gate 12, the terminal $C_{in}$ is connected to a third input terminal of the gate 12 and the signal $\overline{CARRY}_{out}$ is coupled from the output terminal 20 of the gate 11 to a fourth input terminal of the gate 12. As illustrated in the drawing, the X, Y and $C_{in}$ inputs are each to be weighted 1 and the $\overline{CARRY}_{out}$ input is to be weighted 2. This can be accomplished by providing the gate 11 with an output fluid amplifier which provides an output signal having twice the effect on the gate 12 as the remaining inputs supplied thereto. Alternatively, weighting means 23, illustrated by the block W, which may consist of a monostable fluid amplifier as described in my aforementioned copending application, Ser. No. 881,439, may be used to connect the terminal 20 of gate 11 to an input terminal of gate 12. When the two gates 11 and 12 are connected as described, the sum of the given order appears at terminal 18.

Figure 3:
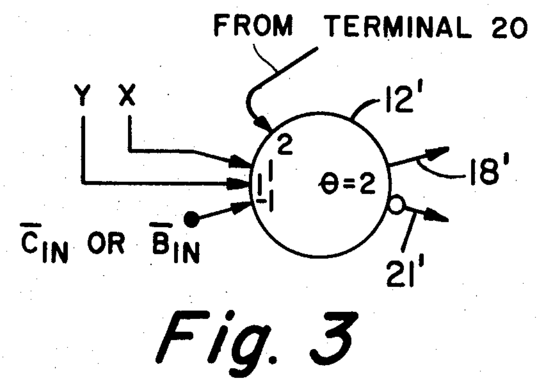
FIG. 3 is a schematic diagram of a modified portion of the circuit of FIG. 2.

It is noted the above realization requires the gate 12 to have four excitatory inputs. This is incompatible with the preferred embodiment described in my aforementioned application, Ser. No. 881,537 wherein only three excitatory inputs are applied to a single threshold gate. However, if it were desired to utilize threshold gates having only three excitatory inputs, one of the inputs could be converted to a negative weighting, thereby yielding the realization: $X = Y = 1$, $\overline{C}_{in} = -1$, $\overline{CARRY}_{out} = 2$, $\theta = 2$. As shown in FIG. 3, this is simply accomplished by connecting the complement of the signal $C_{in}$ to an inhibitory input terminal 17 of the gate 12′ and setting the threshold of the gate 12′ to 2. The gate 11 of FIG. 2 remains unchanged.

Binary subtraction is similar to addition and is accomplished by full subtracters. Subtracters also have two outputs, the DIFFERENCE of the given order and the $BORROW_{out}$ to the next higher order. The logical equations for the subtracter are:

$$DIFFERENCE = X\overline{Y}\overline{B}_{in} + \overline{X}Y\overline{B}_{in} + \overline{X}\overline{Y}B_{in} + XYB_{in}$$

$$BORROW_{out} = \overline{X}Y + \overline{X}B_{in} + YB_{in}$$

A comparison of the logical equations for the adder and subtracter shows that the equations for SUM and DIFFERENCE are identical, since both $C_{in}$ and $B_{in}$ are inputs from a previous order. This implies that both functions can be realized from the same circuitry. Moreover, the equations for $CARRY_{out}$ and $BORROW_{out}$ are of the same form, and differ only in the variable X.

Using the basic adder module of FIG. 2, the subtracter function can be generated as follows. From the logical equations it is seen that the basic difference between an adder and subtracter is in the $CARRY_{out}$ and $BORROW_{out}$ functions. If the threshold of the gate 11 is changed to 1, and the X input weight to −1, the $CARRY_{out}$ can be converted to the $BORROW_{out}$. Although this conversion is perfectly valid, it is not the simplest approach. As most fluidic elements exhibit output duality, the element which generates the function X also generates $\overline{X}$. Therefore, both X and $\overline{X}$ are available as inputs to the threshold gate. If $\overline{X}$ replaces X as an input to the threshold gate, $CARRY_{out}$ is immediately converted to the $BORROW_{out}$ functions.

Since $\overline{CARRY}_{out}$ is used as an input to the threshold gate 12 which generates the SUM function, converting $CARRY_{out}$ to $BORROW_{out}$ changes the SUM to another function, say H. If $\overline{X}$ feeds both threshold gates of the adder, function H becomes:

$$H = \overline{BORROW}_{out}(\overline{X} + Y + B_{in}) + \overline{X}\,Y\,B_{in}$$

$$= (X\overline{Y} + X\overline{B}_{in} + \overline{Y}\,\overline{B}_{in})(\overline{X} + Y + B_{in}) + \overline{X}\,Y\,B_{in}$$

$$= X\,\overline{Y}\,B_{in} + X\,Y\,\overline{B}_{in} + \overline{X}\,\overline{Y}\,\overline{B}_{in} + \overline{X}\,Y\,B_{in}.$$

It is seen that H is not the DIFFERENCE function. However, if the complement of H is taken, the DIFFERENCE is indeed realized. As the fluidic threshold gate generates both the function and its complement, the DIFFERENCE function is readily available at the output terminal 21 of the gate 12. Thus, FIG. 2 illustrates how a fluidic adder is converted to a fluidic subtracter by the simple change of one input variable.

Figures 4, 5:
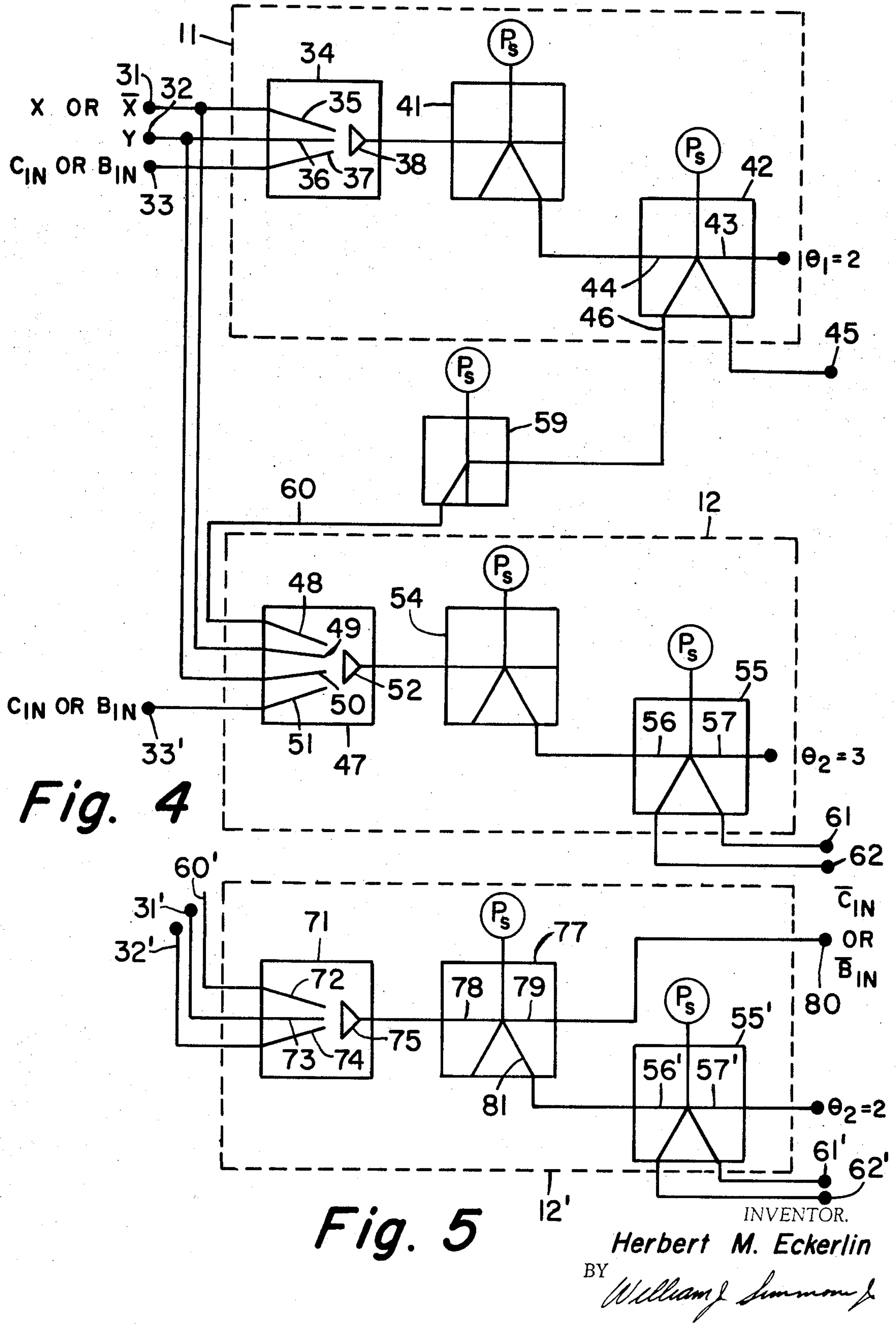
FIGS. 4 and 5 are schematic diagrams which illustrate fluidic components which may be used to construct the circuits illustrated in FIGS. 2 and 3, respectively.

The fluidic circuits schematically shown in FIGS. 2 and 3 consist of the fluidic components shown in FIGS. 4 and 5, respectively. The components of which the threshold gates 11 and 12 of FIG. 1 consist are shown within the dashed lines 11 and 12 of FIG. 4. Similarly, those components which make up the threshold gate 12′ of FIG. 2 are shown within the dashed line 12′ in FIG. 5.

Referring to FIG. 4, the input signal X or $\overline{X}$ is coupled to terminal 31, the input signal Y is coupled to terminal 32 and the input signal $C_{in}$ or $B_{in}$ is coupled to terminal 33. As indicated previously, the signals X and $C_{in}$ are coupled to the input terminals when the circuit is to function as an adder and the signals $\overline{X}$ and $B_{in}$ are coupled to the input terminals when the circuit is to function as a subtracter. The terminals 31, 32 and 33 are coupled to the inlet channels 35, 36 and 37, respectively of a passive summing junction 34. An enlarged outlet channel 38 is aligned with the channels 35, 36 and 37 so that it receives the fluid signals supplied to these inlet channels. Outlet channel 38 is coupled to control channel 44 of bistable fluid amplifier 42 by proportional amplifier 41 which, in this embodiment, merely amplifies the fluid signal supplied by outlet channel 38. A bias pressure is coupled to control channel 43 of amplifier 42 in opposition to the signal applied to control channel 44. The threshold θ, of threshold gate 11 is set at 2 by adjusting the bias pressure supplied to control channel 43 so that a signal is provided at output terminal 45 when positive pressure fluid signals are applied at two or more of the input terminals 31, 32 and 33. The output signal appearing at terminal 45 represents the carry out signal if X is the input to terminal 31, and it represents the borrow out signal if $\overline{X}$ is the input signal to terminal 31. Output channel 46 of fluid amplifier 42 is coupled to inlet channel 48 of passive summing junction 47 which also contains inlet channels 49, 50 and 51. An enlarged outlet channel 52 is aligned with inlet channels 48–51. The X and Y signals supplied to terminals 31 and 32 are respectively connected to inlet channels 49 and 50 of the summing junction while the signal $C_{in}$ or $B_{in}$ is applied to terminal 33' which is coupled to inlet channel 51. Outlet channel 52 is coupled to control channel 56 of bistable fluid amplifier 55 by a proportional fluid amplifier 54. A fluid bias signal is coupled to control channel 57 in opposition to the input signal applied to control channel 56. The pressure of the signal applied to inlet channel 48 of summing junction 47 must have twice the effect of the signals applied to channels 49, 50 and 51. This relationship may be provided by utilizing a bistable fluid amplifier 42 which provides an output pressure at the outlet channel 46 which is sufficiently higher than the signal pressures applied to the inlet channels 49, 50 and 51. If, however, the pressure provided at channel 46 is insufficient to provide the desired pressure relationship, weighting means may be connected between outlet channel 46 and inlet channel 48. This may take the form of a monostable fluid amplifier 59, the control channel of which is coupled to outlet channel 46. The unstable outlet channel of amplifier 59 is connected by line 60 to inlet channel 48. The threshold of threshold gate 12 is set at 3 by adjusting the pressure supplied to the control channel 57 so that an output signal is generated at output terminal 61 when fluid signals are applied to inlet channel 48 and any one of the remaining channels 49, 50 or 51, or when fluid signals are applied to channels 49, 50 and 51, with or without a signal present at the channel 48. When the signal supplied by outlet channel 52 is insufficient to overcome the bias supplied to inlet channel 57 of amplifier 55, an output signal will appear at terminal 62. If the signal X is supplied to terminal 31, the sum signal is generated at terminal 61, and if the signal $\overline{X}$ is supplied to terminal 31, the difference signal is generated at terminal 62. It is noted that the proportional fluid amplifiers 41 and 54 are merely used to amplify the signals supplied by the summing junctions 34 and 47, respectively, in the embodiment shown in FIG. 4. If the input signals supplied to the terminals 31, 32 and 33 are of sufficient pressure, the proportional fluid amplifiers 41 and 54 could be eliminated in this embodiment.

FIG. 5 is a schematic diagram of the fluidic components used in the circuit modification of FIG. 3. Components in FIG. 5 which correspond to similar components in FIG. 4 are indicated by primed reference numerals. In FIG. 5, the four input passive summing junction 47 is replaced by a three input passive summing junction 71 which is similar to summing junction 34 of FIG. 4. Junction 71 includes inlet channels 72, 73 and 74 which are aligned with enlarged outlet channel 75. Summing junction 34, proportional fluid amplifier 41, bistable fluid amplifier 42 and monostable fluid amplifier 49 of FIG. 4 remain unchanged. The fluid signal from line 60 of FIG. 4 is supplied to inlet channel 72 by line 60'. Terminals 31' and 32', which are respectively coupled to inlet channels 73 and 74, represent the connections to terminals 31 and 32 of FIG. 4. The fluid signal from outlet channel 75 is coupled to control channel 78 of proportional fluid amplifier 77 in opposition to the signal $\overline{C}_{in}$ or $\overline{B}_{in}$ which are coupled to control channel 79 of proportional fluid amplifier 77 by way of input terminal 80. Outlet channel 81 of amplifier 77 is coupled to control channel 58' of bistable fluid amplifier 55' in opposition to the bias signal supplied to control channel 57'. In the embodiment shown in FIG. 5, the fluid bias pressure supplied to control channel 57' of bistable fluid amplifier 55' is less than that supplied to control channel 57 of amplifier 55 of FIG. 4 since the threshold of threshold gate 12' is set at 2.

I claim:

1. A fluidic adder-subtracter stage comprising
first, second and third input terminals,
a first passive summing junction having three inlet channels and an outlet channel, said first, second and third input terminals being respectively connected to said inlet channels of said first passive summing junction,
a bistable fluid amplifier having first and second opposed control channels and first and second outlet channels,
a first output terminal connected to said first outlet channel of said first bistable fluid amplifier,
first connecting means connecting said outlet channel of said first passive summing junction to said first control channel of said first bistable fluid amplifier,
means for connecting a source of bias pressure to said second control channel of said first bistable fluid amplifier,
a second passive summing junction having first, second, third and fourth inlet channels and an outlet channel, said first, second and third input terminals being respectively connected to said second, third and fourth inlet channels of said second passive summing junction,
second connecting means connecting said second outlet channel of said first bistable fluid amplifier to said first inlet channel of said second passive summing junction,
a second bistable fluid amplifier having first and second control channels and first and second outlet channels,
third connecting means connecting said outlet channel of said second passive summing junction to said first control channel of said second bistable fluid amplifier,
second and third output terminals respectively connected to said first and second outlet channels of said second bistable fluid amplifier, and
means for connecting a source of bias pressure to said second control channel of said second bistable fluid amplifier.

2. A fluidic adder-subtracter stage in accordance with claim 1 wherein said first connecting means comprises a first proportional fluid amplifier having at least one control channel and at least one outlet channel, said at least one control channel being connected to said outlet channel of said first passive summing junction and said at least one outlet channel being connected to said first control channel of said first bistable fluid amplifier.

3. A fluidic adder-subtracter in accordance with claim 2 wherein said second connecting means comprises a monostable fluid amplifier having at least one control channel and an unstable outlet channel, said at least one control channel being connected to said second outlet channel of said first bistable fluid amplifier and said unstable outlet channel being connected to said first inlet channel of said second passive summing junction.

4. A fluidic adder-subtracter in accordance with claim 3 wherein said third connecting means comprises a second proportional fluid amplifier having at least one control channel and at least one outlet channel, said at least one control channel being connected to said outlet channel of said second passive summing junction and said at least one outlet channel being connected to said first control channel of said second bistable fluid amplifier.

5. A fluidic adder-subtracter stage comprising
first, second, third and fourth input terminals,
a first passive summing junction having three inlet channels and an outlet channel, said first, second and third input terminals being respectively connected to said inlet channels of said first passive summing junction,
a bistable fluid amplifier having first and second opposed control channels, and first and second outlet channels,
a first output terminal connected to said first outlet channel of said first bistable fluid amplifier,
first connecting means connecting said outlet channel of said first passive summing junction to said first control channel of said first bistable fluid amplifier,
means for connecting a source of bias pressure to said second control channel of said first bistable fluid amplifier,
a second passive summing junction having first, second and third inlet channels and an outlet channel, said first and second input terminals being respectively connected to said second and third inlet channels of said second passive summing junction,
second connecting means connecting said second outlet channel of said first bistable fluid amplifier to said first inlet channel of said second passive summing junction,
a proportional fluid amplifier having first and second opposed control channels and at least one outlet channel, said outlet channel of said second passive summing junction being connected to said first control channel of said proportional fluid amplifier, said fourth input terminal being connected to said second control channel of said proportional fluid amplifier,
a second bistable fluid amplifier having first and second control channels and first and second outlet channels, said at least one outlet channel of said proportional fluid amplifier being connected to said first control channel of said second bistable fluid amplifier, said first and second outlet channels of said second bistable fluid amplifier being respectively connected to said second and third output terminals, and
means for connecting a source of bias pressure to said second control channel of said second bistable fluid amplifier.

6. A fluidic adder-subtracter stage in accordance with claim 5 wherein said first connecting means comprises a second proportional fluid amplifier having at least one control channel and at least one outlet channel, said at least one control channel being connected to said outlet channel of said first passive summing junction and said at least one outlet channel being connected to said first control channel of said first bistable fluid amplifier.

7. A fluidic adder-subtracter in accordance with claim 6 wherein said second connecting means comprises a monostable fluid amplifier having at least one control channel and an unstable outlet channel, said at least one control channel being connected to said second outlet channel of said first bistable fluid amplifier and said unstable outlet channel being connected to said first inlet channel of said second passive summing junction.

* * * * *